(12) United States Patent
Johnson et al.

(10) Patent No.: US 10,560,269 B2
(45) Date of Patent: Feb. 11, 2020

(54) METHODS AND SYSTEMS FOR IMPROVED AUTHENTICATED ENCRYPTION IN COUNTER-BASED CIPHER SYSTEMS

(71) Applicant: TrellisWare Technologies, Inc., San Diego, CA (US)

(72) Inventors: Mark Johnson, Poway, CA (US); Peter Ly, Escondido, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 213 days.

(21) Appl. No.: 15/480,203

(22) Filed: Apr. 5, 2017

(65) Prior Publication Data

US 2018/0294968 A1    Oct. 11, 2018

(51) Int. Cl.
*H04L 9/32*    (2006.01)
*H04L 9/06*    (2006.01)

(52) U.S. Cl.
CPC .......... *H04L 9/3239* (2013.01); *H04L 9/0637* (2013.01); *H04L 9/0643* (2013.01); *H04L 2209/80* (2013.01)

(58) Field of Classification Search
None
See application file for complete search history.

(56) References Cited

U.S. PATENT DOCUMENTS

| | | | |
|---|---|---|---|
| 8,805,963 B2 * | 8/2014 | Pantos | H04L 65/1083 709/219 |
| 9,407,437 B1 | 8/2016 | Campagna | |
| 2008/0044012 A1 * | 2/2008 | Ekberg | H04W 12/02 380/30 |
| 2008/0240424 A1 | 10/2008 | Park | |
| 2008/0294926 A1 | 11/2008 | Eshraghian et al. | |
| 2010/0303229 A1 | 12/2010 | Unruh | |
| 2011/0238989 A1 | 9/2011 | Machani et al. | |
| 2011/0286596 A1 * | 11/2011 | Gressel | H04L 9/0637 380/268 |
| 2013/0136256 A1 * | 5/2013 | Relyea | H04L 9/0637 380/28 |

(Continued)

OTHER PUBLICATIONS

David McGrew, Efficient authentication of large, dynamic data sets using Galois/Counter Mode (GCM), 2005, Proceedings of the THird IEEE International Security in Storage Workshop, IEEE. (Year: 2005).*

(Continued)

*Primary Examiner* — Roderick Tolentino
*Assistant Examiner* — Edward X Long
(74) *Attorney, Agent, or Firm* — Perkins Coie LLP

(57) ABSTRACT

Methods and systems for improving authenticated encryption in counter-based cipher systems are presented. Embodiments of the present invention provide secure and efficient means to achieve both the authenticity and privacy goals of authenticated encryption, and are compatible with most block cipher modes of operation, e.g. CBC, CFB and CTR, and most symmetric-key cryptographic functions, e.g. AES, DES and RC5. In particular, using block cipher encryption with data-dependent initialization vectors achieve the privacy goal and enable over-the-air transmissions to remain uncompromised, especially in scenarios that may result in the counter being reset in counter-based cipher systems.

19 Claims, 13 Drawing Sheets

(56) References Cited

U.S. PATENT DOCUMENTS

| | | | | |
|---|---|---|---|---|
| 2013/0275758 A1* | 10/2013 | Marlow | ............... | H04L 9/0861 |
| | | | | 713/171 |
| 2014/0044262 A1* | 2/2014 | Loprieno | .............. | H04L 9/0637 |
| | | | | 380/256 |
| 2014/0146964 A1* | 5/2014 | Yamada | ................ | H04L 9/0637 |
| | | | | 380/28 |
| 2016/0006568 A1* | 1/2016 | Minematsu | ........... | H04L 9/0643 |
| | | | | 713/189 |
| 2016/0378687 A1* | 12/2016 | Durham | ............. | G06F 12/1408 |
| | | | | 713/193 |

OTHER PUBLICATIONS

Philip Rogaway, et al., OCB: A Block-Cipher Mode of Operation for Efficient Authenticated Encryption, Aug. 2003, ACM Transactions on Information and System Security, vol. 6, No. 3, pp. 365-403. (Year: 2003).*

Int'l Search Report and Written Opinion dated Jun. 19, 2018 for PCT Patent Application Publication No. PCT/US18/26100; 9 pages.

* cited by examiner

METHODS AND SYSTEMS FOR IMPROVED AUTHENTICATED ENCRYPTION IN COUNTER-BASED CIPHER SYSTEMS

FIELD OF THE INVENTION

The present invention relates to the field of communication systems, and in particular, to the field of communication systems that require secure and efficient encryption.

BACKGROUND

Communication systems that send over-the-air traffic (OTA) typically require some form of encryption to ensure the privacy and security of the transmitted data. Additionally, many systems require secure authentication in order to prevent miscellaneous data or altered versions of transmitted data to be processed by a receiver.

An authenticated encryption scheme is a mechanism by which a message is transformed into ciphertext and an authentication code with the goal that the ciphertext protect both the privacy and the authenticity of the message. The last several years have seen the emergence of authenticated encryption as a recognized cryptographic goal, and numerous methods have been developed for a variety of communication systems.

One form of authenticated encryption employs a two-pass scheme, wherein two passes are made through the plaintext data; the first aimed at providing authenticity and the other, privacy. FIGS. 1-3 show block diagrams of representative prior art for authenticated encryption, each of which employ a block cipher to encrypt the data and generate a message authentication code (MAC), and then transmit the MAC and ciphertext, to provide authenticity and privacy, respectively. In general, a block cipher generates ciphertext given plaintext, an initialization vector (IV) and a key, wherein the key is a secure component and the ciphertext is transmitted over-the-air. The two-pass schemes considered herein use the same key for both the encryption and MAC generation functionality.

FIG. 1 depicts a block diagram of the "MAC-then-Encrypt" approach, wherein a hash of the plaintext is used to generate the MAC, and subsequently, a function of the plaintext and the MAC is encrypted using a block cipher to generate the ciphertext. In addition to the plaintext/MAC input, the block cipher relies on an initialization vector (IV) and a key. The MAC and ciphertext are transmitted over-the-air.

A variation of this scheme is shown in FIG. 2, which depicts a block diagram of the "Encrypt-and-MAC" approach, wherein the plaintext is first encrypted using the block cipher to generate the ciphertext, and then independently processed using the hash function to generate the MAC. The ciphertext and MAC are transmitted over-the-air.

FIG. 3 depicts the EAX mode of operation for another variant typically referred to as authenticated encryption with associated data. This variant ensures the privacy of the plaintext message as well as the authenticity of the plaintext and an additional header string. As seen in FIG. 3, the ciphertext to be transmitted over-the-air is generated using a single-pass through a block cipher, but the MAC is generated as a function of encrypted representations of the IV, the OTA ciphertext and the header string, each of which are processed using a block cipher that is of a different type than that used to encrypt the plaintext.

Each of the prior art approaches use block ciphers, and in particular, may employ counter-based block ciphers, which are an especially important class of block ciphers due to their efficiency. These counter-based cipher systems utilize time or simple incrementing counter (or a function of that counter), that is known at both the transmitter and receiver, to generate the IV. Once this system is synchronized, the IV need not be transmitted over-the-air, thereby reducing overhead. The overhead may dominate in communication systems with short message payloads, and its reduction is paramount in systems with constrained throughputs.

However, it is essential that the counter in the counter-based systems never repeats, since using a common IV (generated from a common counter value) on different plaintext data may result in a security breach for many block cipher modes. As seen in FIGS. 1-3, none of the prior art approaches can ensure that a counter-based IV will not repeat, since avoiding reuse of the same counter value can be challenging.

In practice, the counter value may repeat in a number of scenarios, which results in an identical IV being used to encrypt more than one block of plaintext. Simple counters can be reset by reboot or re-initialization operations. Time-based counters may repeat if continuous service is not available. In an example, a communication system utilizing the GPS system for a distributed time reference may start up under conditions with an approximate time if GPS is unavailable, and later, when GPS becomes available, it may determined that the time base need to be adjusted back. In this situation, the time-based IV would repeat, thereby comprising the security of the over-the-air transmissions.

Counter-based block ciphers are increasing in use due to their efficient implementations and minimization of over-the-air transmissions. Thus, there is a need for generating initialization vectors that do not repeat in counter-based cipher systems.

SUMMARY

Embodiments described herein provide systems and methods for improved authenticated encryption, and specifically, generating non-repeating IVs in counter-based cipher systems. In particular, the IV used to achieve the privacy goal may be generated as a function of the counter-based IV and the authentication code. That is, since the IV is based on both the counter (which may repeat) and the authentication tag (which will not repeat since it is data dependent), the IV will not repeat even when used in the more efficient counter-based cipher systems that may reset under various conditions as described above.

In one embodiment, a system for improved authenticated encryption comprises an encryption and authentication code generation module configured to: generate one or more blocks of cryptographic output using a first cryptographic function, a plurality of blocks of plaintext, and a key; generate a first tag based on the one or more blocks of cryptographic output; generate a first initialization vector based on a counter and the first tag; and generate a plurality of blocks of ciphertext using a second cryptographic function, the plurality of blocks of plaintext, the first initialization vector and the key. The second cryptographic function may be a block cipher, and the first initialization vector and the key may be inputs to the second cryptographic function. A transmitter is configured to transmit the plurality of blocks of ciphertext and the first tag. A receiver is configured to receive the plurality of blocks of ciphertext and the first tag. A decryption and authentication code verification module is configured to generate the plurality of blocks of plaintext using the second cryptographic function, the plurality of blocks of ciphertext, the first initialization vector and the key; generate the one or more blocks of cryptographic output using the first cryptographic function, the plurality of blocks of plaintext and the key; generate a second tag based on the one or more blocks of cryptographic output; compare the first tag and the second tag; and declare successful authentication if the comparison is equal.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

These and other features, aspects, and advantages of the embodiments described herein will become better understood with regard to the following description, claims, and accompanying drawings, where:

Figure 1:
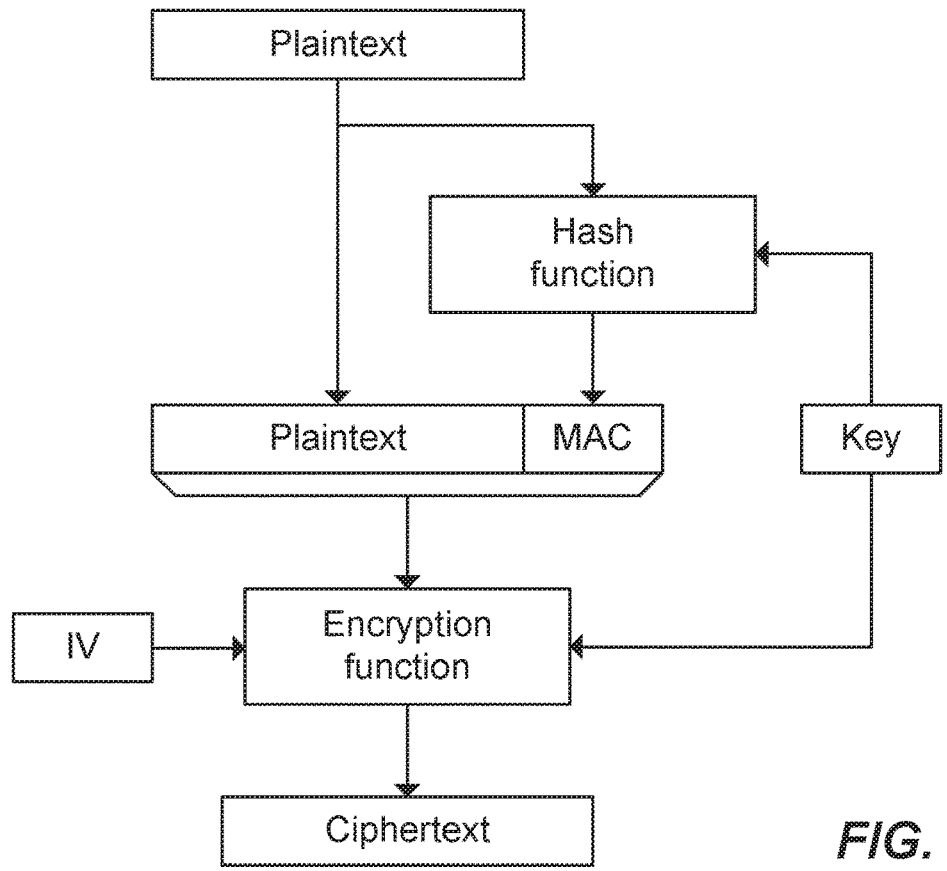
FIG. 1 is a block diagram of an example of representative prior art for authenticated encryption.
Figure 2:
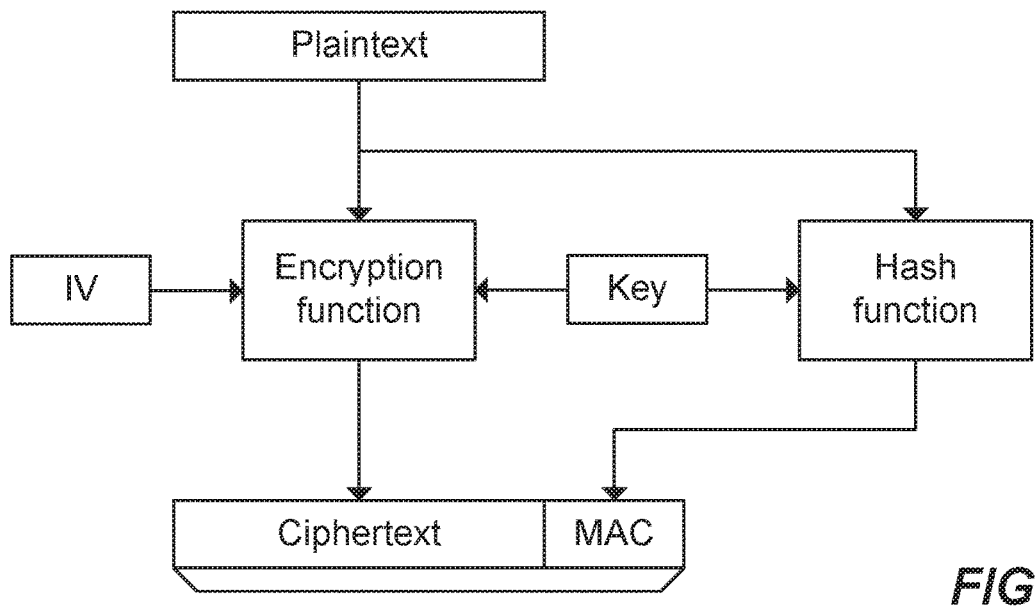
FIG. 2 is a block diagram of another example of representative prior art for authenticated encryption.
Figure 3:
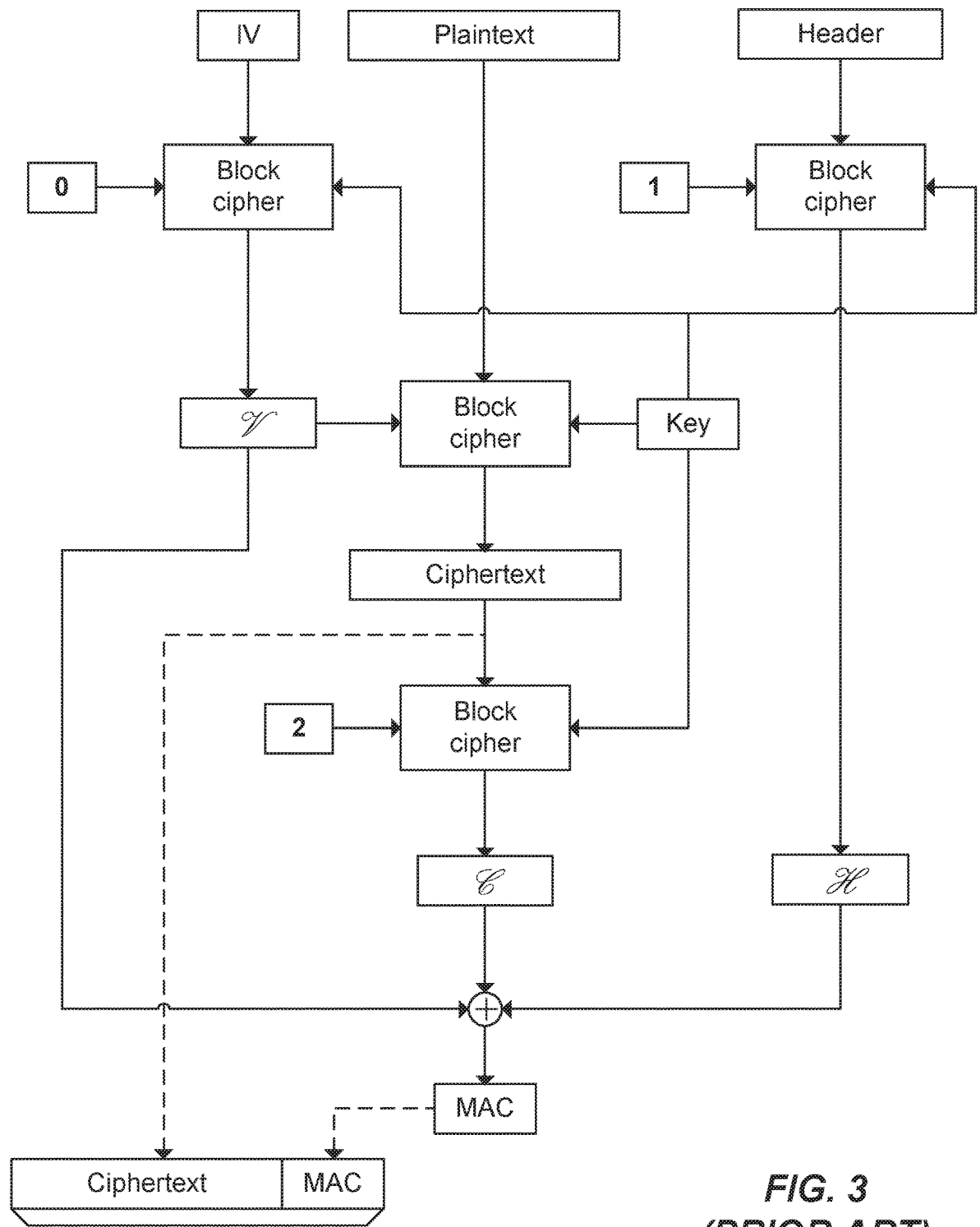
FIG. 3 is a block diagram of yet another example of representative prior art for authenticated encryption.

Like labels are used to refer to the same or similar components in the drawings.

DETAILED DESCRIPTION

Figure 4:
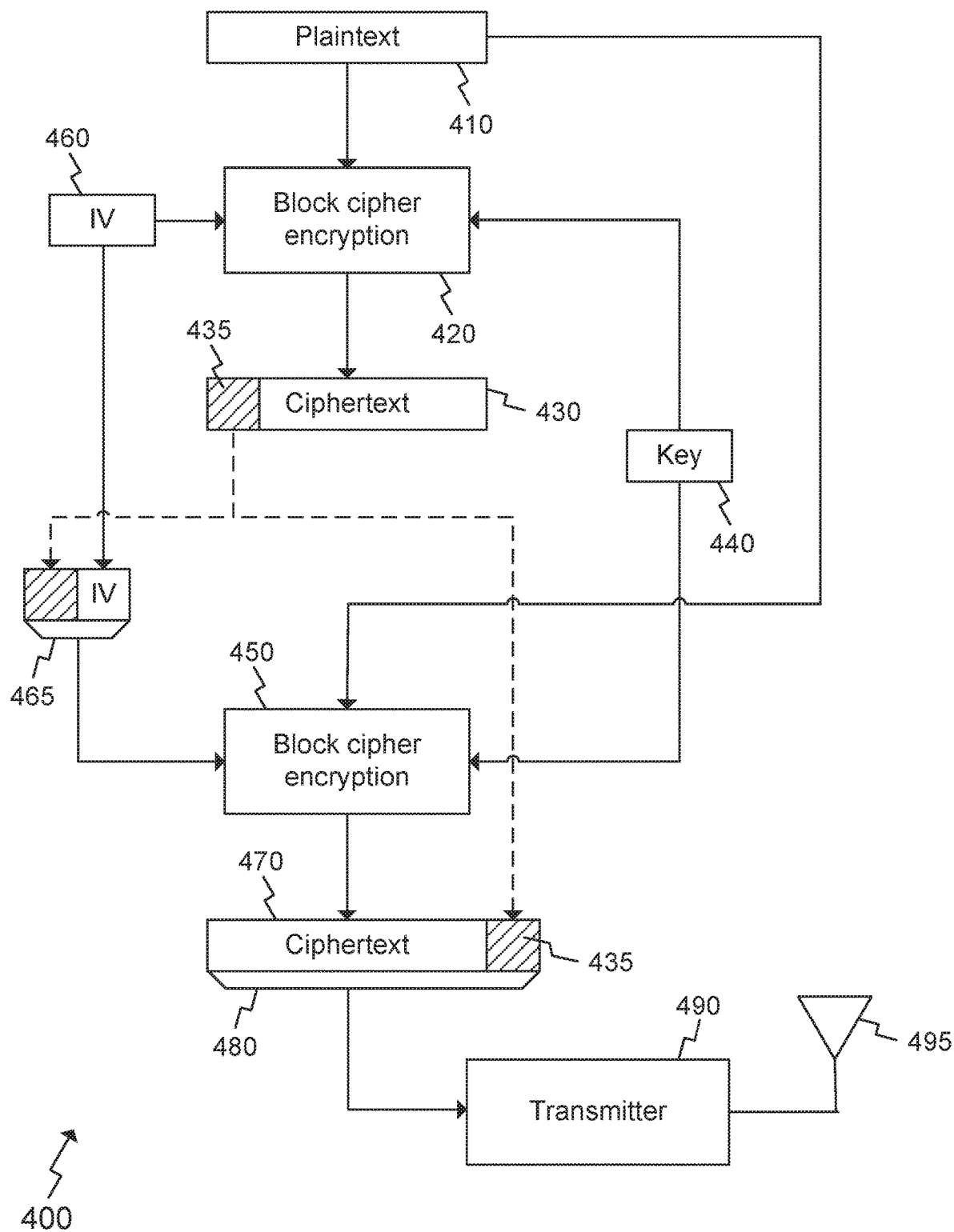
FIG. 4 is a block diagram for encryption and authentication code generation for improved authenticated encryption, according to an embodiment of the present invention.

FIG. 4 depicts a block diagram for encryption and authentication code generation for improved authenticated encryption, according to an embodiment of the present invention. The two-pass improved authenticated encryption method shown in FIG. 4 comprises a first block cipher encryption module 420, which is used for the generation of the authentication code, and a second block cipher encryption module 450 that is used for the encryption step of the improved authenticated encryption system.

As seen in FIG. 4, plaintext 410 is input to the first block cipher encryption module 420, in addition to an initialization vector (IV) 460 and a key 440. The first block cipher encryption module 420 generates ciphertext 430. In an embodiment, a portion of the ciphertext 430 is used as the authentication code or tag 435.

The tag 435, which is dependent on the data, is combined with the IV 460, and is used as a new IV 465 for the second block cipher encryption module 450. The second block cipher encryption module 450 uses the data-dependent IV 465 and the same key 440 to encrypt the plaintext 410 and generate ciphertext 470. In an embodiment, the concatenated ciphertext 470 and tag 435 are transmitted over-the-air using a transmitter 490 and an antenna 495. In another embodiment, the ciphertext 470 and the tag 435 may be transmitted separately.

Figure 5:
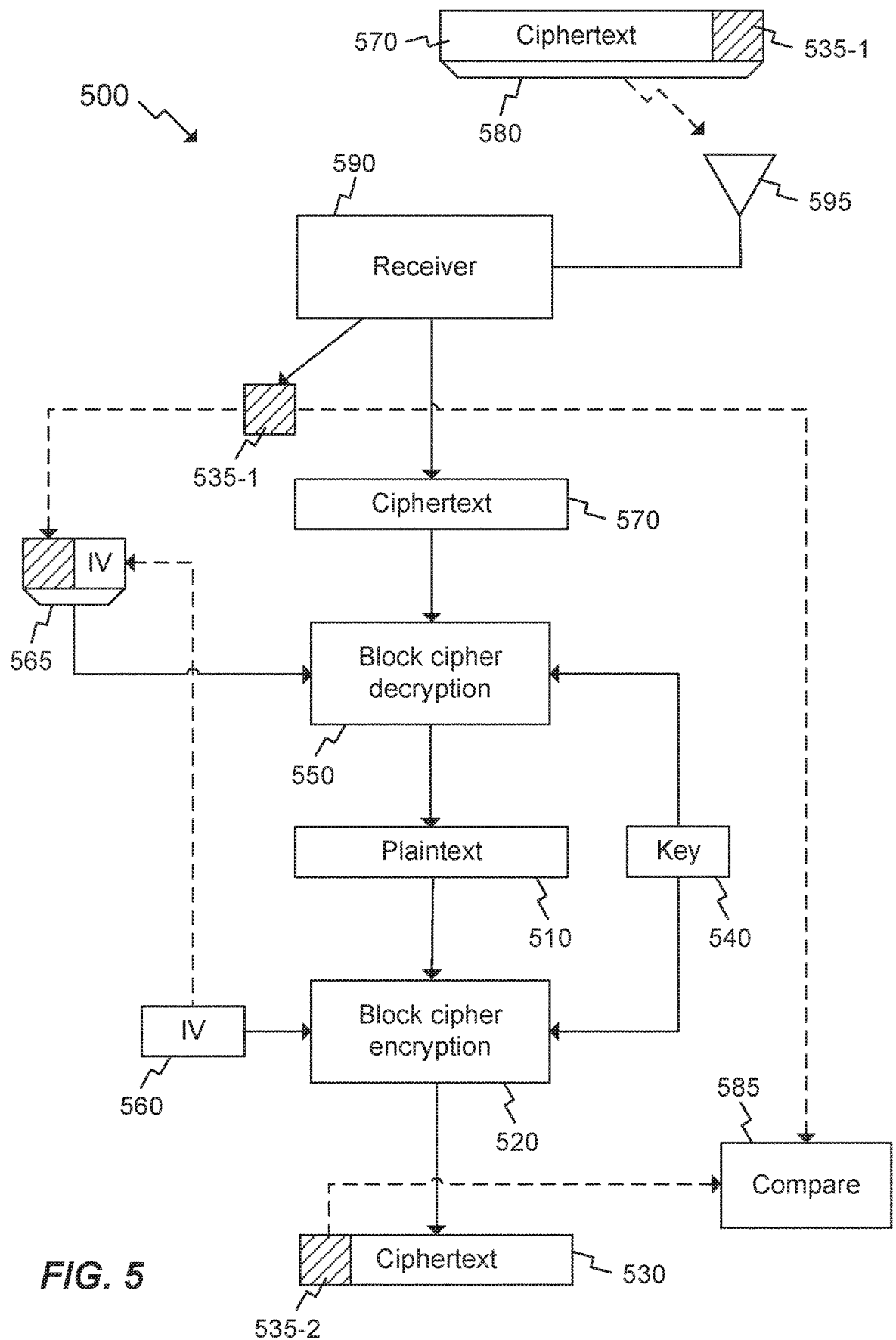
FIG. 5 is a block diagram for decryption and authentication code verification for improved authenticated encryption, according to an embodiment of the present invention.

FIG. 5 depicts a block diagram for decryption and authentication code verification for improved authenticated encryption, according to an embodiment of the present invention. This embodiment includes some features and/or components that are similar to those shown in FIG. 4 and described above. At least some of these features and/or components may not be separately described in this section.

The decryption and authentication code verification system shown in FIG. 5 is the inverse of encryption and authentication code generation system shown in FIG. 4. In an embodiment, a receiver 590 receives a concatenated over-the-air transmission 580 comprising the ciphertext 570 and the tag 535-1 using antenna 595.

An initialization vector 560 is combined with the OTA tag 535-1 to generate a data-dependent IV 565 that is an input to a block cipher decryption module 550 along with a key 540, and which generates plaintext 510 given the OTA ciphertext 570. The decrypted plaintext 510 is re-encrypted, using the key 540 and the original initialization vector 560, by a block cipher encryption module 520 to generate ciphertext 530. In an embodiment, a portion of the ciphertext 530 is extracted as a tag 535-2. This tag 535-2 is compared to the OTA tag 535-1 using a comparison module 585, and authentication can be assured based on the two tags being identical.

Figure 6:
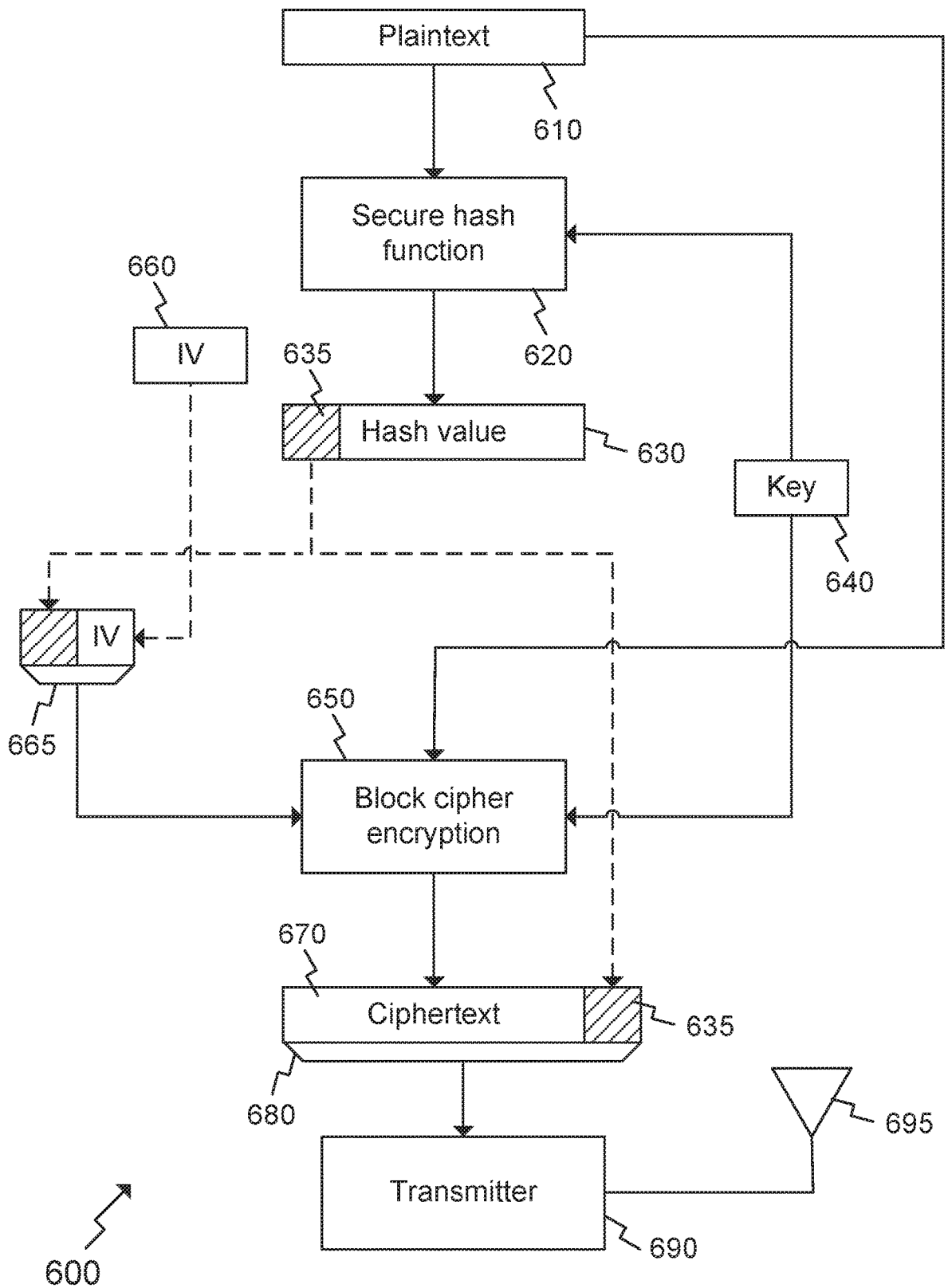
FIG. 6 is a block diagram for encryption and authentication code generation for improved authenticated encryption, according to another embodiment of the present invention.

FIG. 6 depicts a block diagram for encryption and authentication code generation for improved authenticated encryption, according to another embodiment of the present invention. This embodiment includes some features and/or components that are similar to those shown in FIGS. 4-5 and described above. At least some of these features and/or components may not be separately described in this section.

The embodiment for encryption and authentication code generation for improved authenticated encryption shown in FIG. 6 is similar to that shown in FIG. 4, but substitutes a secure hash function 620 in the place of the block cipher encryption module 420. The secure hash function 620 may be any version (denoted "x") of the Secure Hash Algorithm (SHA-x), the Message Digest (MDx), the RACE Integrity Primitives Evaluation Message Digest (RIPEMD-x), BLAKE-x, or any other hash function known in the art. The secure hash function 620 generates a hash value 630 of a fixed length given the plaintext input 610, and the tag 635 is a portion of the hash value 630.

In general, embodiments in FIGS. 4 and 6 show that embodiments are not restricted to the specific encryption functions used in a counter-based cipher system. That is, some embodiments may allow the cryptographic function for the privacy goal of the authenticated encryption to be a block based cipher. On the other hand, the cryptographic function used to achieve the authenticity goal may be any function that can convert plaintext to ciphertext.

Figure 7:
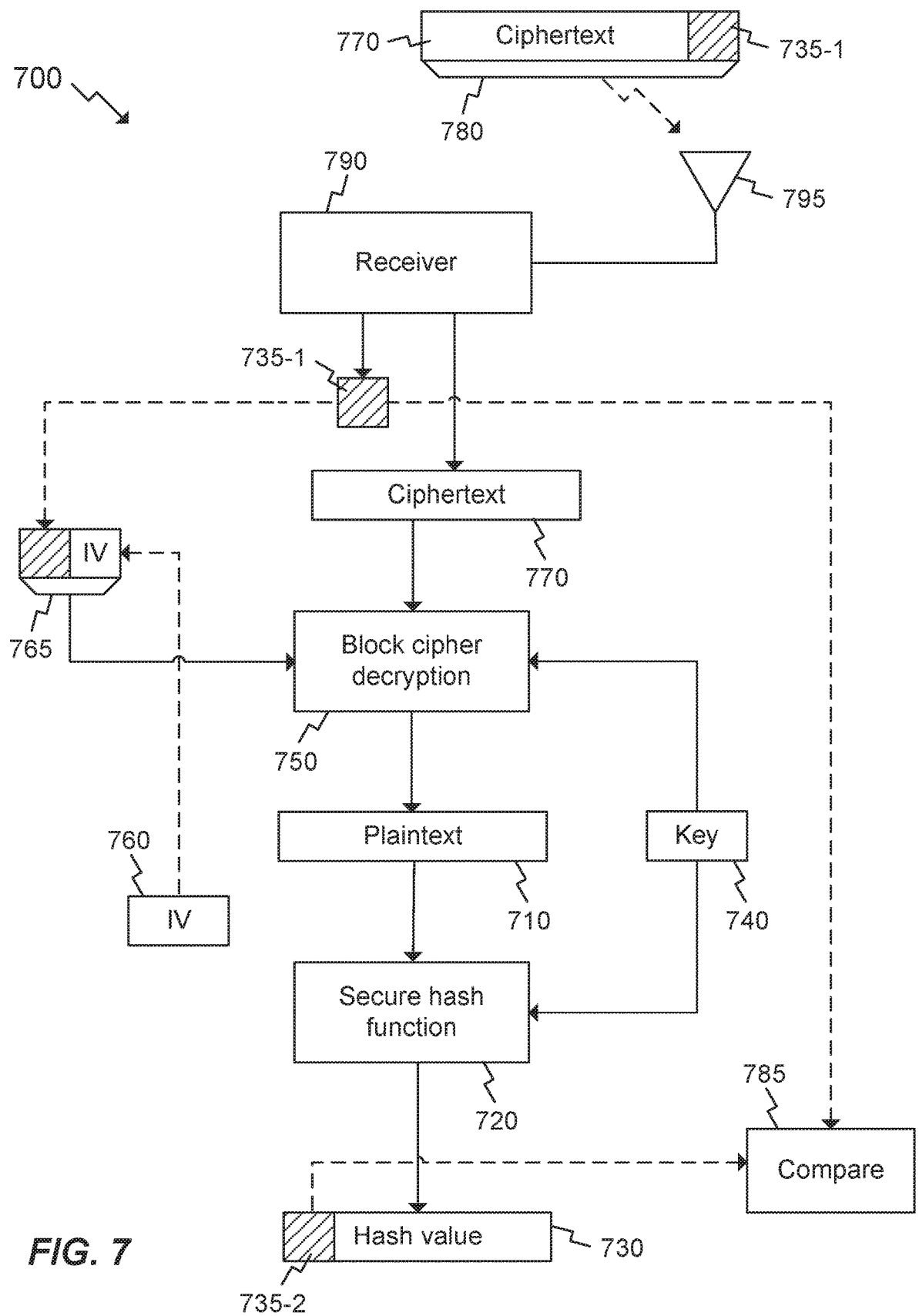
FIG. 7 is a block diagram for decryption and authentication code verification for improved authenticated encryption, according to another embodiment of the present invention.

FIG. 7 depicts a block diagram for decryption and authentication code verification for improved authenticated encryption, according to an embodiment of the present invention. This embodiment includes some features and/or components that are similar to those shown in FIGS. 4-6 and described above. At least some of these features and/or components may not be separately described in this section. The embodiment shown in FIG. 7 is similar to that shown in FIG. 5, but substitutes a secure hash function 720 in the place of the block cipher encryption 520.

As discussed above, the advantages of some embodiments are not restricted by the type of block cipher module used in the embodiments shown in FIGS. 4-7. For example, the block cipher modules 520 and 550 in FIG. 5, and the block cipher module 750 in FIG. 7, may be any one of the following symmetric-key block ciphers: Propagating Cipher Block Chaining (PCBC), Counter (CTR), Output Feedback (OFB), Cipher Feedback (CFB) and Cipher Block Chaining (CBC). Some embodiments may use a common symmetric-key block cipher to achieve both the authenticity and privacy goals, whereas other embodiments may use distinct symmetric-key block ciphers for the first-pass and the second-pass of the improved authenticated encryption systems and methods.

Figure 8A:
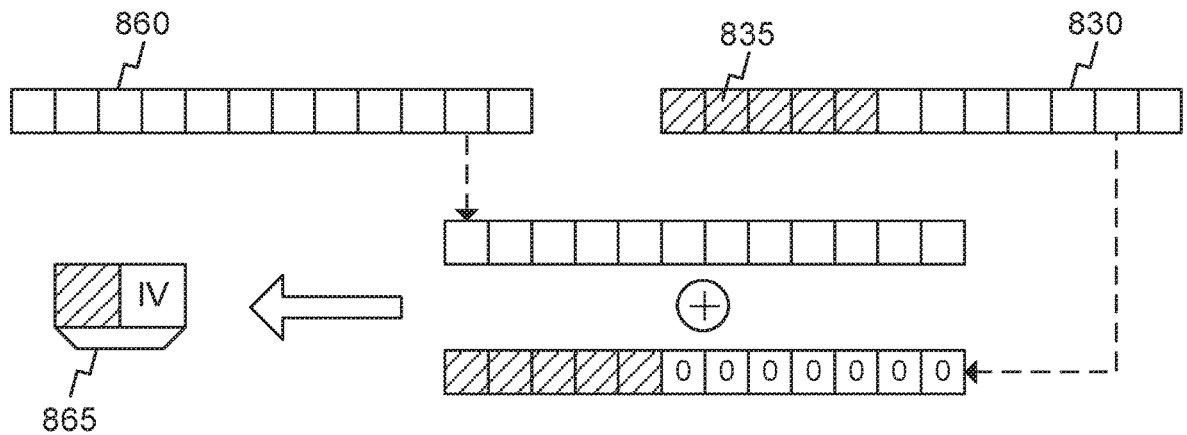
FIGS. 8A, 8B and 8C are block diagrams for generating data-dependent initialization vectors, according to embodiments of the present invention.
Figure 8B:
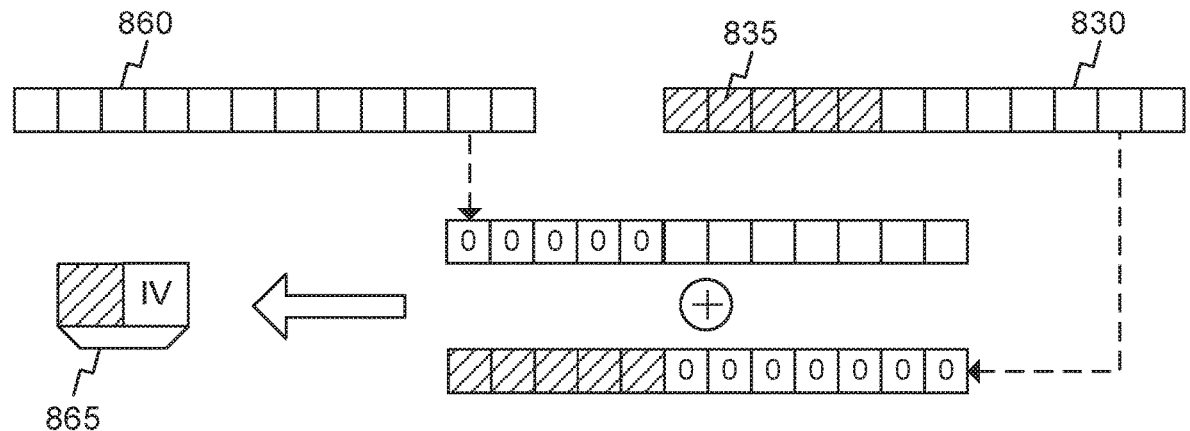
Figure 8C:
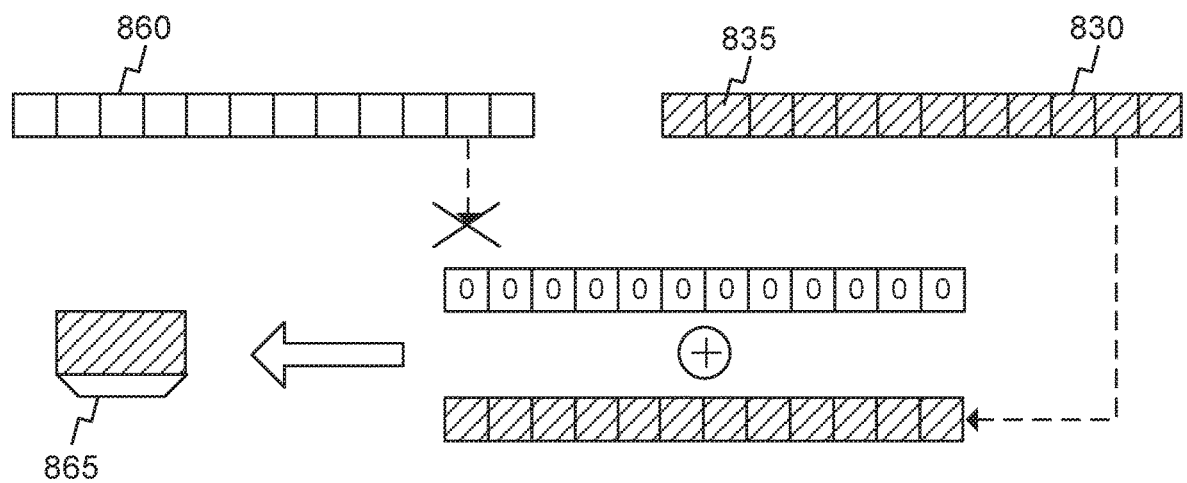

FIGS. 8A, 8B and 8C depict different embodiments for generating the data-dependent initialization vectors, according to embodiments of the present invention, and as described above in the context of FIGS. 4-7. In FIG. 8A, the tag 835 is a portion of the ciphertext 830, and is zero-padded to the length of the initialization vector 860 prior to being XOR-ed with the counter-based initialization vector 860 to generate the data-dependent IV 865. This embodiment results in an initial portion of the counter-based IV being augmented by the data-dependent tag, ensuring that the IV used to achieve the privacy goal does not repeat.

In FIG. 8B, the tag 835 is a portion of the ciphertext 830, and is zero-padded to the length of the initialization vector 860 prior to being XOR-ed with a partially zeroed-out version of the counter-based initialization vector 860. That is, an initial portion of the counter-based IV 860 with a length equal to the length of the tag 835 is zeroed-out, and then XOR-ed with the zero-added tag, thereby resulting in the data-dependent IV 865 being a concatenation of the tag 835 and a portion of counter-based IV 860.

In the embodiments shown in FIGS. 8A and 8B, the partitioning of the counter-based IV 860 and the tag 835 allows for a tradeoff between counter repeat interval and authentication code strength. In an embodiment, this tradeoff may entirely favor authentication code strength, as shown in FIG. 8C, wherein the entire ciphertext 830 is used as the tag 835, and consequently as the data-dependent tag 865. In this embodiment, since the counter-based IV 860 is not used (or equivalently, completely zeroed-out prior to XOR-ing with the tag 835), there is no need to increment the counter for the encryption and decryption processes.

Figure 9:
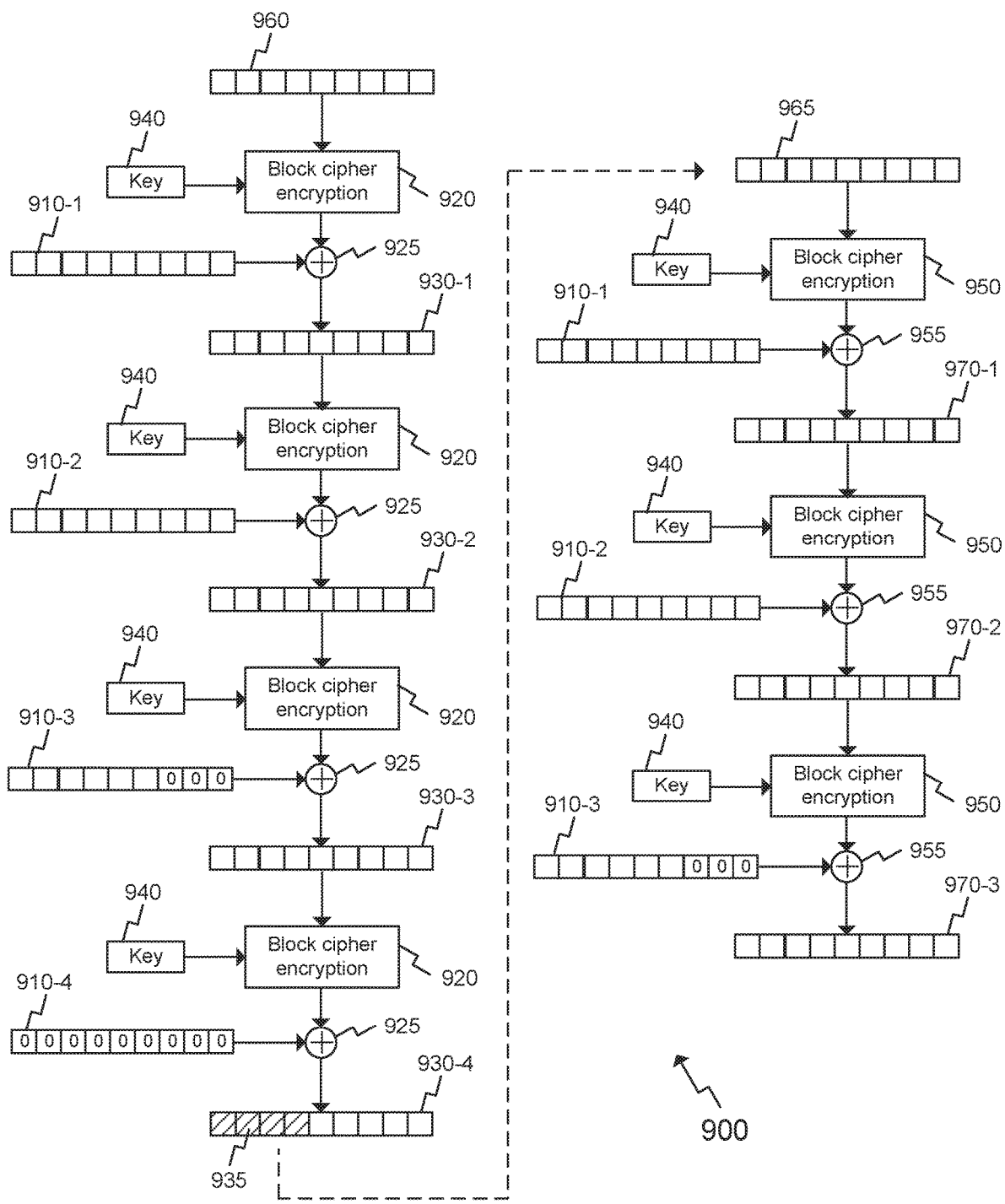
FIG. 9 is a block diagram for an encryption and authentication code generation for improved authenticated encryption using the cipher feedback (CFB) mode, according to an embodiment of the present invention.

FIG. 9 is a block diagram for an encryption and authentication code generation for improved authenticated encryption using the cipher feedback (CFB) mode of operation, according to an embodiment of the present invention. This embodiment includes some features and/or components that are similar to those shown in FIGS. 4-6 and described above. At least some of these features and/or components may not be separately described in this section.

The improved authenticated encryption block diagram shown in FIG. 9 uses the cipher feedback (CFB) mode of operation to achieve both the privacy and authentication goals, thereby enabling a more efficient and compact hardware and software implementation. The left-hand portion of FIG. 9 shows the CFB mode of operation for authentication which starts with the block cipher encryption module 920 generating a keystream (not explicitly shown) based on a counter-based IV 960 and a key 940, which is XOR-ed with the first block of plaintext 910-1 to generate a first block of ciphertext 930-1 using an adder 925.

Each subsequent step of the CFB-based authentication process comprises using the ciphertext generated in the previous stage as the initialization vector for the next block cipher encryption module, which generates a keystream that is XOR-ed with a subsequent block of plaintext to generate a subsequent block of ciphertext. Recall that a block cipher may operate on fixed-length inputs, and in an embodiment, the plaintext is zero-padded to be a multiple of the required input length, as shown in FIG. 9.

That is, the last portion of plaintext 910-3 is zero-padded and XOR-ed with the keystream (not shown) generated by the block cipher encryption module 920 to produce a penultimate block of ciphertext 930-3. This block of ciphertext is then used as an IV to encrypt a block of zeros 910-4 to generate a final block of ciphertext 930-4. A portion of the final block of ciphertext 930-4 is used as the authentication code or tag 935.

The tag 935 is combined with the counter-based IV 960 to generate a data-dependent IV 965, and may employ one of the methods described in the context of FIG. 8. Subsequent to the generation of the new IV 965, it is used in the encryption portion of the process shown on the right-hand side of FIG. 9, wherein multiple blocks of ciphertext (970-1, 970-2 and 970-3) are generated from the multiple blocks of plaintext (910-1, 910-2 and 910-3), respectively. The blocks of ciphertext and the tag 935 are transmitted over-the-air.

The block cipher encryption module 920 may employ any one of many commonly used symmetric-key cryptographic functions to generate the keystream (not shown in FIG. 9) that is XOR-ed with the blocks of plaintext. Some embodiments may use one of Data Encryption Standard (DES), Advanced Encryption Standard (AES), International Data Encryption Algorithm (IDEA), AES128, AES192, AES256, Triple DES, RC5 and Blowfish engines to encrypt the plaintext. For example, an embodiment may use the CFB mode of operation with an AES 256 engine, whereas another embodiment may employ the Cipher Block Chaining (CBC) mode of operation with an RC5 engine. Each of these embodiments ensure that the security of OTA transmission when using counter-based initialization vectors is not compromised.

Figure 10:
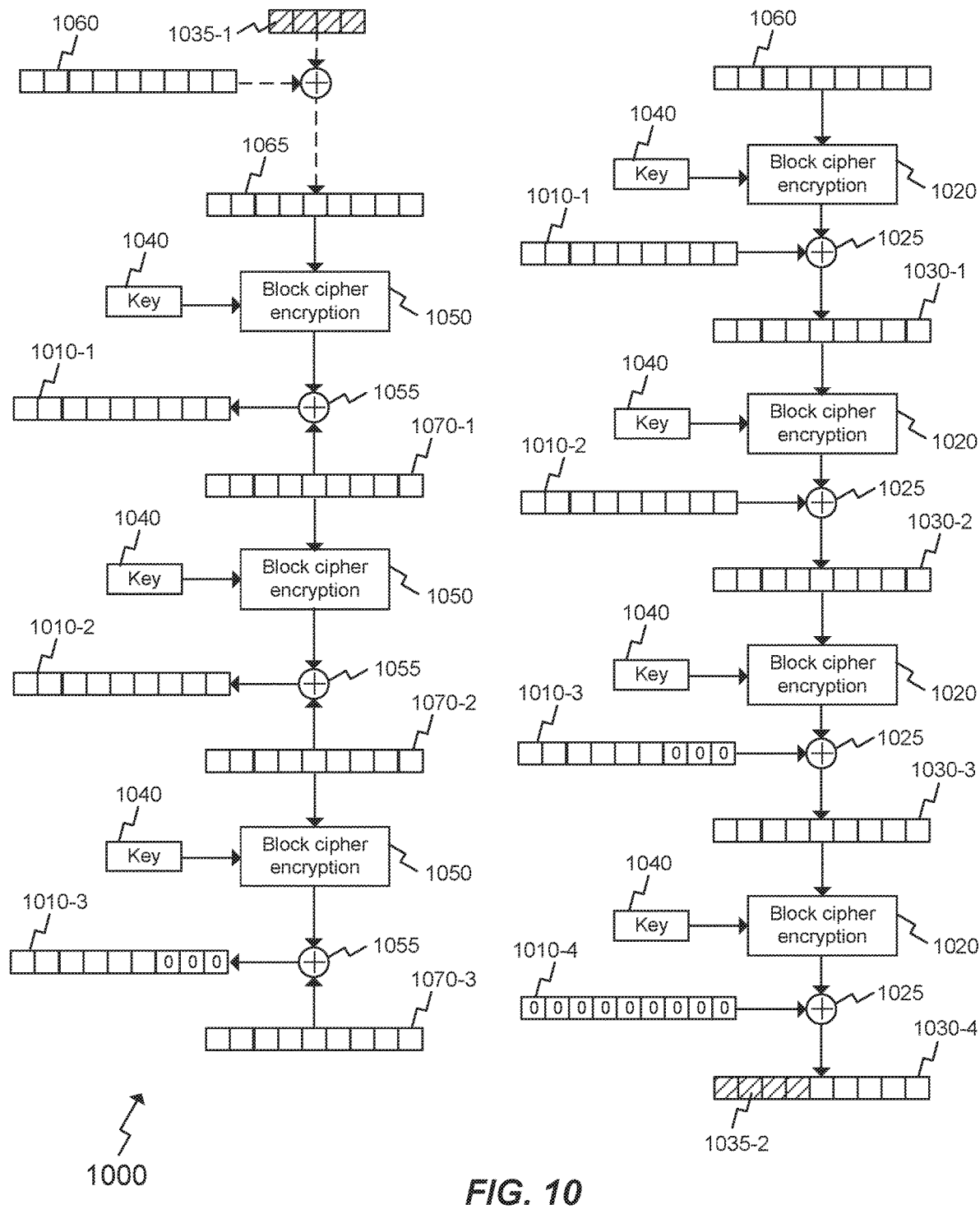
FIG. 10 is a block diagram for decryption and authentication code verification for improved authenticated encryption using the cipher feedback (CFB) mode, according to an embodiment of the present invention.

FIG. 10 is a block diagram for decryption and authentication code verification for improved authenticated encryption using the cipher feedback (CFB) mode of operation, according to an embodiment of the present invention. This embodiment includes some features and/or components that are similar to those shown in FIGS. 4-6 and 9, and described above. At least some of these features and/or components may not be separately described in this section.

The decryption portion, shown on the left-hand side of FIG. 10, of the decryption and authentication code verification for improved authenticated encryption process, is executed first upon reception of the tag 1035-1 and the blocks of ciphertext (1070-1, 1070-2 and 1070-3). The counter-based IV 1060 is generated locally, and combined with the tag 1035-1 to generate the data-dependent IV 1065. The new IV 1065 is used in conjunction with the key 1040 and the first block of ciphertext 1070-1 to generate the first block of plaintext 1010-1. Specifically, the keystream (not shown in FIG. 10) generated by the block cipher encryption module 1050 is XOR-ed with the first block of ciphertext 1070-1 to generate the first block of plaintext 1010-1. The first block of ciphertext 1070-1 is also used as the IV for decrypting the second block of ciphertext 1070-2 to generate the second block of plaintext 1010-2.

The authentication portion, shown on the right-hand side of FIG. 10, is then run and encrypts the blocks of plaintext (1010-1, 1010-2, 1010-3 and 1010-4) to generate a corresponding number of blocks of ciphertext (1030-1, 1030-2, 1030-3 and 1030-4). A portion of the last block of ciphertext is extracted as a tag 1035-2. In order to authenticate the message, the OTA tag 1035-1 may be matched to the computed tag 1035-2 to ensure that they are identical.

FIGS. 9 and 10 depict an embodiment of the present invention wherein the CFB mode of operation is used for both authentication and encryption. A single block cipher encryption module may be used in this implementation since the generation of the blocks of ciphertext (in the encryption process) and the blocks of plaintext (in the decryption process) is successive.

Figure 11:
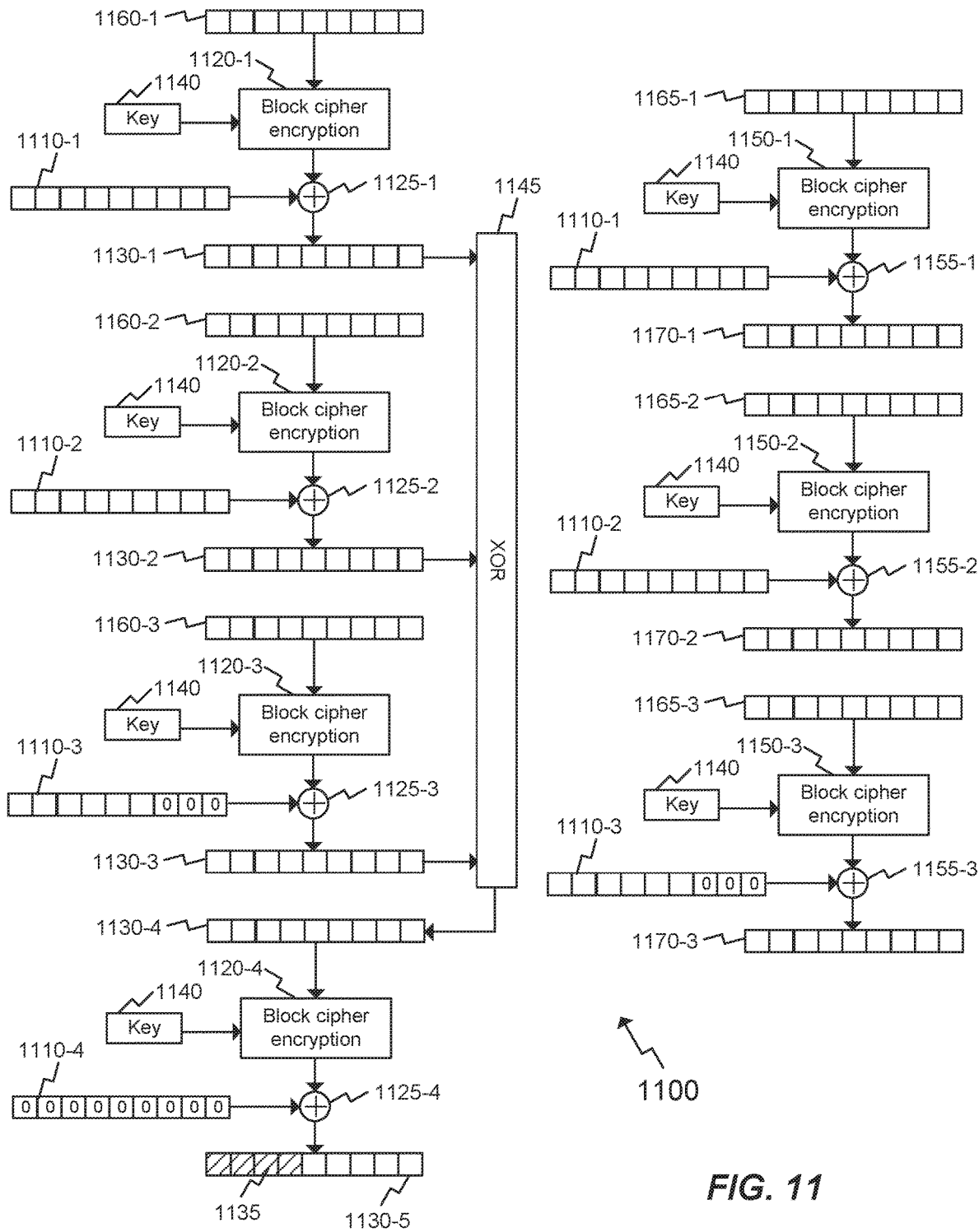
FIG. 11 is a block diagram for an encryption and authentication code generation for improved authenticated encryption using the counter (CTR) mode, according to another embodiment of the present invention.

FIG. 11 is a block diagram for an encryption and authentication code generation for improved authenticated encryption using the counter (CTR) mode of operation, according to another embodiment of the present invention. This embodiment includes some features and/or components that are similar to those shown in FIGS. 4-6 and 9-10, and described above. At least some of these features and/or components may not be separately described in this section.

In contrast to the successive implementation of FIG. 9, the embodiment shown in FIG. 11 uses the counter (CTR) mode of operation, which is implemented as a parallel computation. That is, a counter-based initialization vector 1160-1 is incremented to generate subsequent initialization vectors, denoted 1160-2 and 1160-3 in FIG. 11. Each of these counter-based IVs is used to encrypt all but the last block of plaintext to simultaneously generate all but the last block of ciphertext.

In an embodiment, one or more of the blocks of ciphertext (1130-1, 1130-2 and 1130-3) may be processed by an XOR function 1145 to generate an IV 1130-4 for the final block of plaintext 1110-4, which is encrypted by a block cipher encryption module 1120-4 to generate the final block of ciphertext 1130-5. A portion of the last block of ciphertext may be used as the tag 1135 for authentication.

The tag 1135 can be combined with each of the counter-based IVs (1160-1, 1160-2 and 1160-3) to generate a set of data-dependent initialization vectors (1165-1, 1165-2 and 1165-3) that may be used to encrypt the plaintext to generate blocks of ciphertext (1170-1, 1170-2 and 1170-3) which are transmitted over-the-air, along with the tag 1135. In an alternate embodiment, the tag 1135 may be combined with the first counter-based IV 1160-1 to generate the data-dependent IV 1165-1. Then, the first data-dependent IV 1165-1 may be incremented to generate the subsequent tags 1165-2 and 1165-3. Thus, FIG. 11 depicts an implementation for improved authenticated encryption that can be run efficiently in parallel for high-speed communication applications that have low latency requirements.

Figure 12:
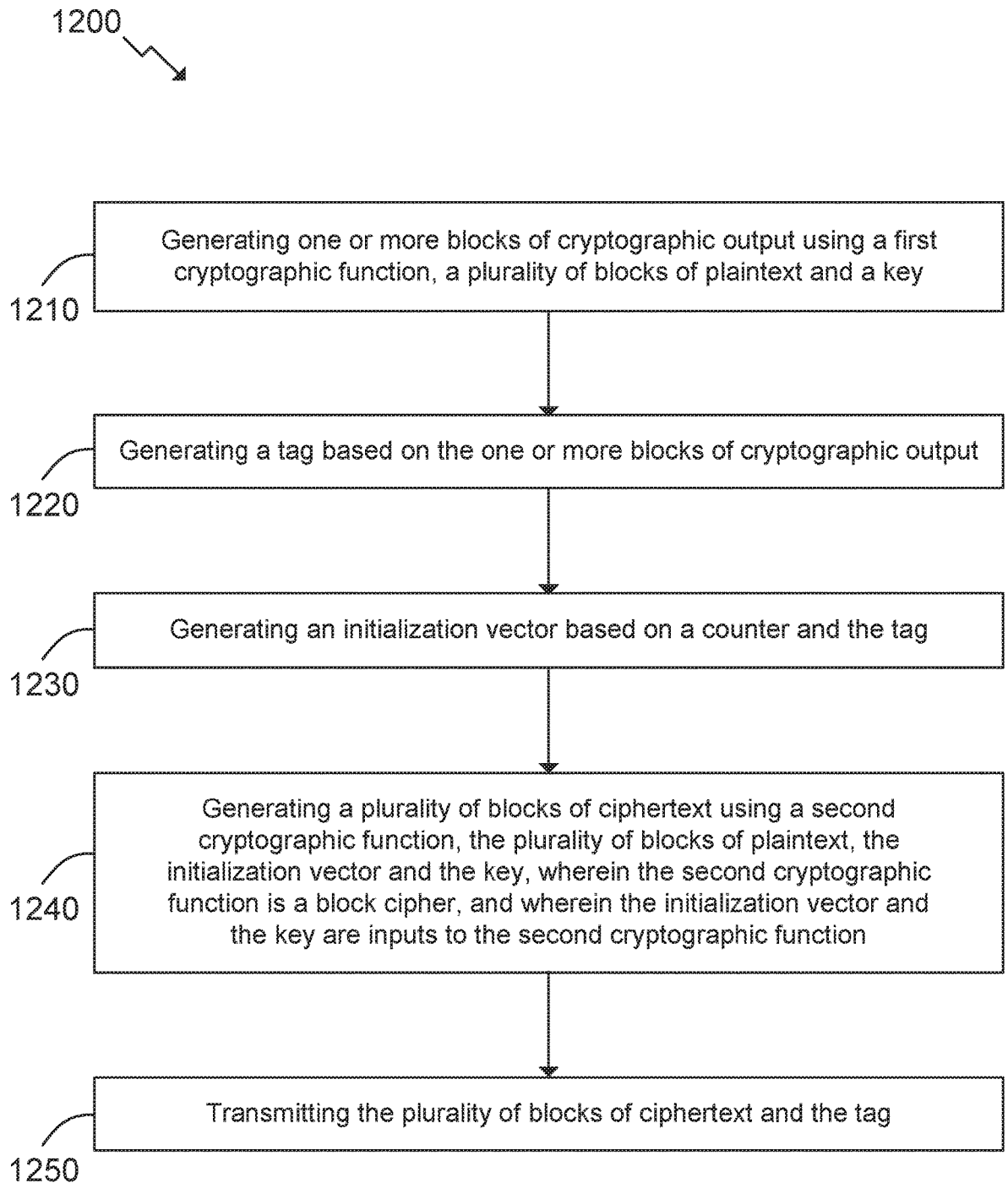
FIG. 12 is a flowchart for a method for encryption and authentication code generation for improved authenticated encryption, according to an embodiment of the present invention.

FIG. 12 is a flowchart for a method for encryption and authentication code generation for improved authenticated encryption, according to an embodiment of the present invention. In some embodiments, the order of steps in flowchart 1200 may be changed. Furthermore, some of the steps in flowchart 1200 may be skipped or additional steps added.

With reference to FIGS. 4-6 and 9-11, the method 1200 begins at step 1210 wherein at least a plurality of blocks of plaintext and a key are used by a first cryptographic function to generate one or more blocks of cryptographic output. In an embodiment, the first cryptographic function may be a secure hash function, which will generate a fixed-length hash value for any number of blocks of plaintext. In another embodiment, the first cryptographic function may be a block cipher function, which generates a block of ciphertext for each input block of plaintext. In addition, the block cipher function further requires an initialization vector as an input, wherein the IV is typically counter-based for the cipher systems considered herein.

The plurality of blocks of plaintext may be received through an input/output (I/O) interface, and in an embodiment, may be voice or video data. Alternatively, the plaintext may be generated in an internal processor. The key used by the cryptographic functions (both the first one described above, and the second one that will be discussed below) may be generated using a local key generator, which may be part of a processor. In another embodiment, the key may be securely received via an over-the-air transmission.

At step 1220, a tag (or authentication code) is generated based on the one or more blocks of cryptographic output. In embodiments with the first cryptographic function being a secure hash function, the tag may be a portion of the hashed output. In other embodiments with the first cryptographic function being a block cipher function, the tag may be a portion of the last block of ciphertext. As discussed above, the block cipher function may operate in PCBC, CTR, OFB, CFB or CBC modes, and use any underlying cipher engine. The generation of the tag using the first cryptographic function is the first pass of the two-pass improved authenticated encryption scheme, and achieves the authentication goal of the method.

At step 1230, an initialization vector is generated based on a counter-based IV and the tag generated at step 1220. In embodiments with the first cryptographic function being a block cipher function, the counter-based IV is the same one used as an input to the block cipher function. The IV generated in this step is used in the second pass to achieve the privacy goal of the two-pass improved authenticated encryption method. Since the IV is a function of the tag generated by the first cryptographic function, this new IV is data-dependent, and combining it with a counter-based IV ensures that the new IV does not repeat in scenarios wherein the counter mechanism is reset.

At step 1240, the data-dependent IV, the key and the blocks of plaintext are used as inputs to a second cryptographic function which generates a plurality of blocks of ciphertext. Some embodiments use any one of the block cipher functions enumerated above as the second cryptographic function to encrypt the blocks of plaintext using the data-dependent IV. This ensures that when the plurality of blocks of ciphertext generated at this step are transmitted over the air, their security remains uncompromised.

At step 1250, the plurality of blocks of ciphertext generated at step 1240 and the tag generated at step 1220 are transmitted. In counter-based cipher systems, once the nodes are synchronized, the counter-based IVs can be generated in the order required, and thus it is not necessary to transmit the IV over the air.

Figure 13:
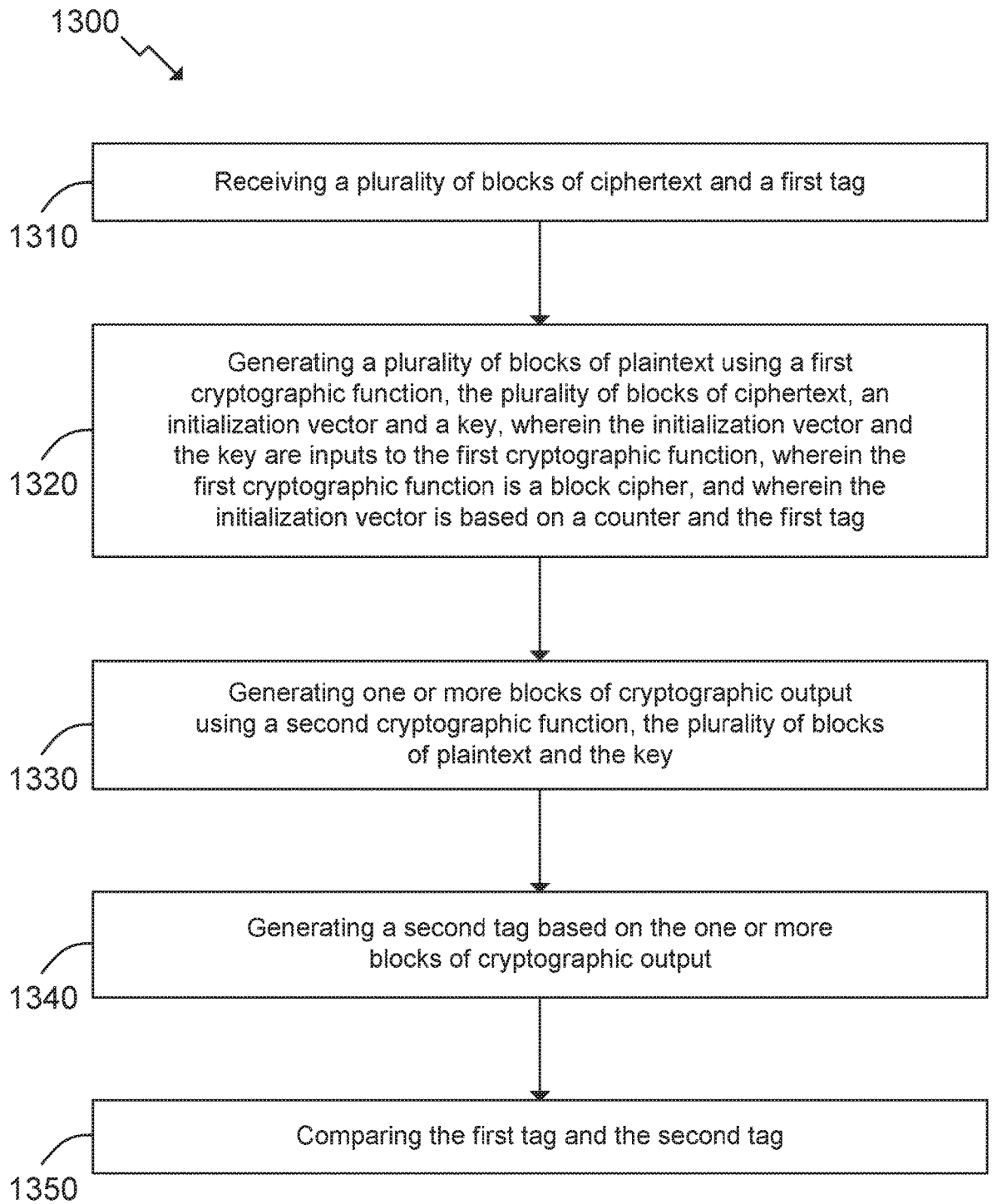
FIG. 13 is a flowchart for a method for decryption and authentication code verification for improved authenticated encryption, according to an embodiment of the present invention.

FIG. 13 is a flowchart for a method for decryption and authentication code verification for improved authenticated encryption, according to an embodiment of the present invention. In some embodiments, the order of steps in flowchart 1300 may be changed. Furthermore, some of the steps in flowchart 1300 may be skipped or additional steps added.

With reference to FIGS. 4-6 and 9-11, the method 1300 begins at step 1310 wherein the tag and blocks of ciphertext (generated in 1200) are received. In an embodiment, the blocks of ciphertext and the tag may be received separately. In another embodiment, the ciphertext and the tag may be received concatenated as part of the same block, packet or transmission.

At step 1320, an initialization vector is generated based on a counter-based IV and the tag received at step 1310. A first cryptographic function, which is a block cipher function, uses this data-dependent IV and the key to decrypt the received blocks to ciphertext, and generate the plurality of blocks of plaintext, which achieves the privacy goal.

At step 1330, the plaintext is re-encrypted by a second cryptographic function using at least the key. In an embodiment, the second cryptographic function may be a block cipher function, which also requires the counter-based IV as an input. The block cipher function will generate a block of ciphertext for each input block of plaintext. In another embodiment, the second cryptographic function may be a secure hash function, and the plurality of blocks of plaintext may be hashed into a single output ciphertext block. In yet another embodiment, the secure hash function may be used independently on each block of plaintext, thereby generating a hashed output block for each input block of plaintext.

At step 1340, a second tag is generated from the blocks of ciphertext generated in the previous step. For example, if the second cryptographic function is a hash function and a single hashed output block was generated, the tag may be a portion of that output ciphertext block. In other embodiments, if the second cryptographic function generated a plurality of output ciphertext blocks, the tag may be generated from the final block of blocks of ciphertext.

At step 1350, the second tag generated at step 1340 is compared to the tag received in step 1310, and determining that the two tags are identical completes the authentication goal.

Figure 14:
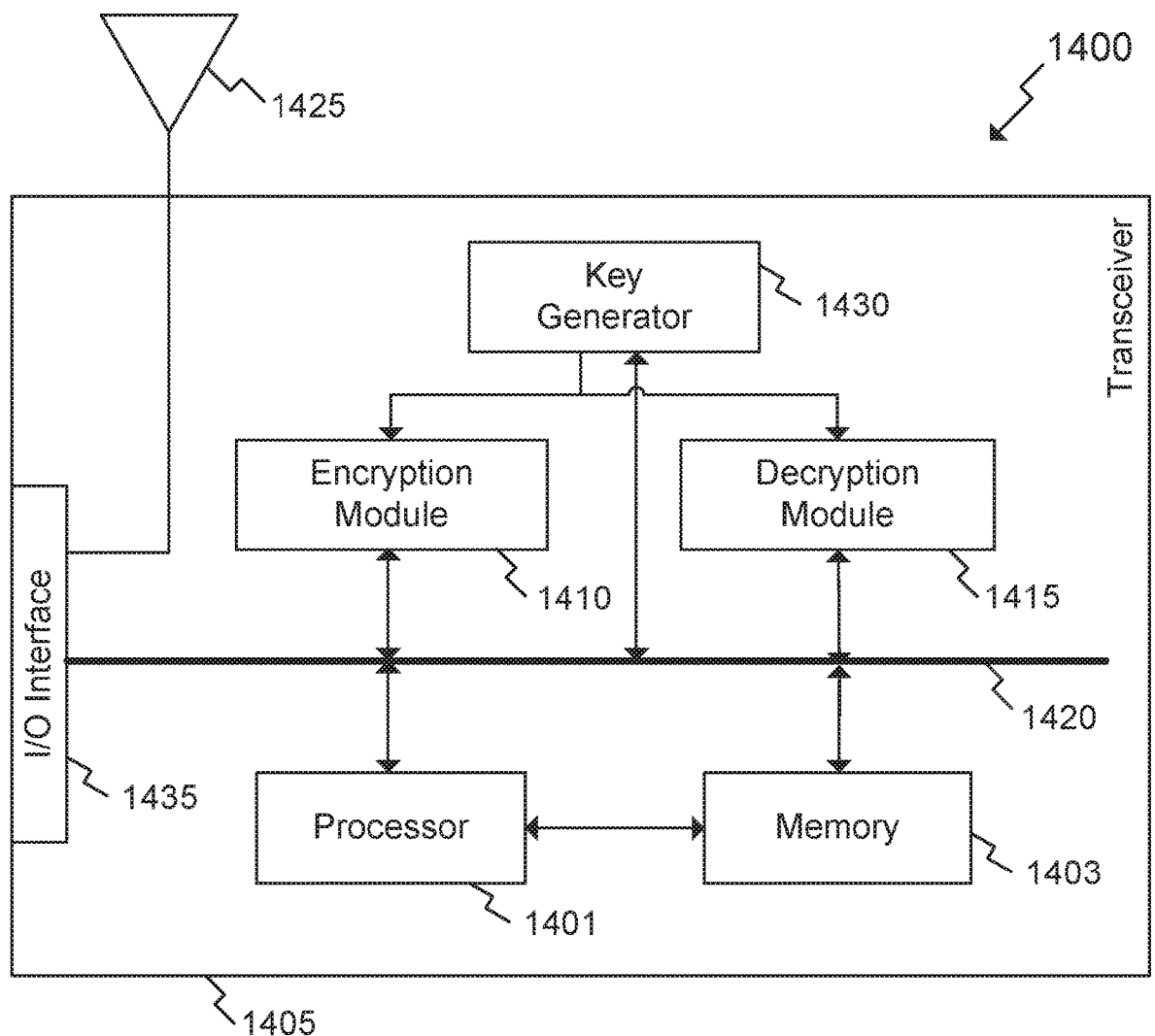
FIG. 14 is a block diagram of a system for improved authenticated encryption, according to an embodiment of the present invention.

A transceiver 1405 for improved authenticated encryption, according to an embodiment of the present invention, is shown in FIG. 14. This transceiver is provided merely as an example that may be used with the methods described herein. A processor 1401 is connected to a memory 1403 that interfaces with a key generator 1430, an encryption module 1410 and a decryption module 1415 via an interface 1420. The key generator 1430 may be configured to generate a common key for both passes of the two-pass improved authenticated encryption methods described herein for the encryption module 1410 and the decryption module 1415. The modules or the processor 1401 may generate the IV, whereas the plaintext is received from the input/output (I/O) interface 1435, and an antenna 1425 connected to the I/O interface 1435 may be used to transmit the ciphertext and the tag.

In an embodiment, the key generator 1430, the encryption module 1410 and the decryption module 1415 may be embedded in the processor 1401. In another embodiment, the encryption and decryption modules may be implemented in a field programmable gate array (FPGA) and the key generator may be implemented in software. In yet another embodiment, the encryption and decryption modules, as well as the key generator, may be implemented in software, either in an ARM or other processor.

The processor 1401 shown in FIG. 14 may comprise component digital processors and may be configured to execute computer-executable program instructions stored in memory 1403. For example, the component digital processors may execute one or more computer programs for receiving or generating a random keystream, generating random start points and shuffled lists, generating a base frequency, band frequencies and jitter values based on the random start points and shuffled lists, and communicating on different frequencies as specified by the generated frequency hopping sequence in accordance with some embodiments.

Processor 1401 may comprise a variety of implementations for the computation of link quality metrics, average cost functions and rate-loss cost functions, and minimization and selection operations, as well as a microprocessor, a digital signal processor (DSP), an application-specific integrated circuit (ASIC), one or more field programmable gate arrays (FPGAs), state machines, or the like. Processor 1401 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1403 may comprise a non-transitory computer-readable medium that stores instructions which, when executed by the processor 1401, cause the processor 1401 to perform various steps, such as those described herein. Examples of computer-readable media include, but are not limited to, electronic, optical, magnetic, or other storage or transmission devices capable of providing the processor 1401 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1401 and the processing described may be in one or more structures, and may be dispersed throughout one or more structures.

While the present subject matter has been described in detail with respect to specific embodiments thereof, it will be appreciated that those skilled in the art, upon attaining an understanding of the foregoing, may readily produce modifications to, variations of, and equivalents to such embodiments. For example, features of one or more embodiments may be combined with one or more features of other embodiments without departing from the scope of the invention. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A system for improved authenticated encryption, comprising:
   a first hardware processor, coupled to a transmitter, configured to:
      generate one or more blocks of a first cryptographic output using a first cryptographic function, a first plurality of blocks of plaintext and a key;
      generate a first tag based on the one or more blocks of the first cryptographic output;
      generate a first initialization vector based on the first tag and a second initialization vector based on a counter such that the first initialization vector does not repeat upon the counter being reset; and
      generate a plurality of blocks of ciphertext using a second cryptographic function, the first plurality of blocks of plaintext, the first initialization vector and the key, wherein the second cryptographic function is a block cipher, and wherein the first initialization vector and the key are inputs to the second cryptographic function;
   the transmitter configured to:
      transmit the plurality of blocks of ciphertext and the first tag;
   a receiver configured to:
      receive the plurality of blocks of ciphertext and the first tag; and
   a second hardware processor, coupled to the receiver, configured to:
      generate the first initialization vector based on the received first tag and the second initialization vector based on a counter;
      generate a second plurality of blocks of plaintext using the second cryptographic function, the plurality of blocks of ciphertext, the first initialization vector and the key;
      generate one or more blocks of a second cryptographic output using the first cryptographic function, the second plurality of blocks of plaintext and the key;
      generate a second tag based on the one or more blocks of the second cryptographic output; and
      compare the first tag and the second tag.

2. The system of claim 1, wherein the first cryptographic function is a secure hash function, wherein the second cryptographic function comprises a block cipher engine, and wherein the block cipher engine comprises a symmetric-key cryptographic function.

3. The system of claim 2, wherein the secure hash function is selected from the group consisting of Secure Hash Algorithm (SHA-x), Message Digest (MDx), RACE Integrity Primitives Evaluation Message Digest (RIPEMD-x) and BLAKE-x.

4. The system of claim 1, wherein the first cryptographic function is a block cipher, wherein the second initialization vector and the key are inputs to the first cryptographic function, and wherein a length of the first initialization vector is equal to a length of the second initialization vector.

5. The system of claim 4, wherein each of the first and the second cryptographic functions is selected from the group consisting of Propagating Cipher Block Chaining (PCBC), Counter (CTR), Output Feedback (OFB), Cipher Feedback (CFB) and Cipher Block Chaining (CBC).

6. The system of claim 4, wherein each of the first and the second cryptographic functions comprises a block cipher engine, and wherein the block cipher engine comprises a symmetric-key cryptographic function.

7. The system of claim 6, wherein the symmetric-key cryptographic function is selected from the group consisting of Data Encryption Standard (DES), Advanced Encryption Standard (AES), International Data Encryption Algorithm (IDEA), AES128, AES192, AES256, Triple DES, RC5 and Blowfish.

8. The system of claim 4, wherein the first initialization vector is an XOR of the second initialization vector and the first tag, and wherein the first tag is zero-padded to the length of the second initialization vector.

9. The system of claim 4, wherein the first initialization vector is a concatenation of a portion of the second initialization vector and a portion of the first tag.

10. The system of claim 4, wherein a last block of the one or more blocks of the first cryptographic output is a function of two or more previous blocks of the one or more blocks of the first cryptographic output, and wherein the two of more previous blocks are generated in parallel.

11. The system of claim 1, wherein the counter comprises an irregular increment.

12. The system of claim 1, wherein the counter is based on one or more of a time field from a GPS signal, a channel number, and a slot start time.

13. The system of claim 1, wherein the first tag is a portion of the one or more blocks of the first cryptographic output.

14. A method for encryption and authentication code generation for improved authenticated encryption, comprising:
   generating one or more blocks of cryptographic output using a first cryptographic function, a plurality of blocks of plaintext and a key;
   generating a tag based on the one or more blocks of cryptographic output;
   generating a first initialization vector based on the tag and a second initialization vector based on a counter such that the first initialization vector does not repeat upon the counter being reset;
   generating a plurality of blocks of ciphertext using a second cryptographic function, the plurality of blocks of plaintext, the first initialization vector and the key, wherein the second cryptographic function is a block cipher, and wherein the first initialization vector and the key are inputs to the second cryptographic function; and
   transmitting the plurality of blocks of ciphertext and the tag.

15. The method of claim 14, wherein the first cryptographic function is a secure hash function, wherein the second cryptographic function comprises a block cipher engine, and wherein the block cipher engine comprises a symmetric-key cryptographic function.

16. The method of claim 14, wherein the first cryptographic function is a block cipher, wherein the second initialization vector and the key are inputs to the first cryptographic function, and wherein a length of the first initialization vector is equal to a length of the second initialization vector.

17. A method for decryption and authentication code verification for improved authenticated encryption, comprising:
   receiving a plurality of blocks of ciphertext and a first tag;
   generate a first initialization vector based on the received first tag and the second initialization vector based on a counter such that the first initialization vector does not repeat upon the counter being reset;

generating a plurality of blocks of plaintext using a first cryptographic function, the plurality of blocks of ciphertext, the first initialization vector and a key, wherein the first initialization vector and the key are inputs to the first cryptographic function, wherein the first cryptographic function is a block cipher;

generating one or more blocks of cryptographic output using a second cryptographic function, the plurality of blocks of plaintext and the key;

generate a second tag based on the one or more blocks of cryptographic output; and compare the first tag and the second tag.

18. The method of claim 17, wherein the first cryptographic function is a secure hash function, wherein the second cryptographic function comprises a block cipher engine, and wherein the block cipher engine comprises a symmetric-key cryptographic function.

19. The method of claim 17, wherein the first cryptographic function is a block cipher, wherein the second initialization vector and the key are inputs to the second cryptographic function, and wherein a length of the first initialization vector is equal to a length of the second initialization vector.

* * * * *